United States Patent
Wang et al.

(10) Patent No.: US 6,592,653 B2
(45) Date of Patent: Jul. 15, 2003

(54) FLUID STORAGE AND DELIVERY SYSTEM UTILIZING LOW HEELS CARBON SORBENT MEDIUM

(75) Inventors: Luping Wang, Brookfield, CT (US); Joseph Salsbury, Ithaca, NY (US)

(73) Assignee: Advanced Technology Materials, Inc., Danbury, CA (US)

(*) Notice: Subject to any disclaimer, the term of this patent is extended or adjusted under 35 U.S.C. 154(b) by 0 days.

(21) Appl. No.: 10/020,268

(22) Filed: Nov. 12, 2001

(65) Prior Publication Data
US 2003/0106429 A1 Jun. 12, 2003

(51) Int. Cl.[7] .............................................. B01D 53/04
(52) U.S. Cl. ............................. 95/131; 95/143; 95/903; 96/108; 96/130; 206/0.7; 502/416
(58) Field of Search ........................... 96/108, 126, 130, 96/143, 146, 147, 153; 95/95, 96, 106, 114, 115, 127, 131, 133, 143, 144, 148, 902, 903; 206/0.7; 502/416

(56) References Cited

U.S. PATENT DOCUMENTS

| | | | |
|---|---|---|---|
| 4,744,221 A | | 5/1988 | Knollmueller .............. 62/46.1 |
| 5,518,528 A | | 5/1996 | Tom et al. .................... 95/103 |
| 5,536,301 A | * | 7/1996 | Lansbarkis et al. ........... 95/117 |
| 5,676,735 A | * | 10/1997 | McManus ..................... 95/106 |
| 5,704,965 A | | 1/1998 | Tom et al. ....................... 95/95 |
| 5,704,967 A | | 1/1998 | Tom et al. ..................... 96/143 |
| 5,993,766 A | * | 11/1999 | Tom et al. .................... 206/0.7 |
| 6,027,547 A | * | 2/2000 | Tom et al. ..................... 95/106 |
| 6,083,298 A | * | 7/2000 | Wang et al. .................. 95/102 |
| 6,309,446 B1 | * | 10/2001 | Nakanoya et al. .......... 502/418 |

* cited by examiner

*Primary Examiner*—David A. Simmons
*Assistant Examiner*—Frank Lawrence
(74) *Attorney, Agent, or Firm*—William F. Ryann

(57) ABSTRACT

A fluid storage and dispensing system including a vessel containing a low heel carbon sorbent having fluid adsorbed thereon, with the system arranged to effect desorption of the fluid from the sorbent for dispensing of fluid on demand. The low heel carbon sorbent preferably is characterized by at least one of the following characteristics: (i) Heel, measured for gaseous arsine ($AsH_3$) at 20° C. at 20 Torr, of not more than 50 grams $AsH_3$ per liter of bed of the sorbent material; (ii) Heel, measured for gaseous boron trifluoride ($BF_3$) at 20° C. at 20 Torr, of not more than 20 grams boron trifloride per liter of bed of the sorbent material; (iii) Heel, measured for gaseous germanium tetrafluoride ($GeF_4$) at 20° C. at 20 Torr, of not more than 250 grams $AsH_3$ per liter of bed of the sorbent material; (iv) Heel, measured for gaseous arsenic pentafluoride ($AsF_5$) at 20° C. at 20 Torr, of not more than 700 grams $AsF_5$ per liter of bed of the sorbent material; (v) Heel, measured for gaseous trimethyl silane (3MS) at 20° C. at 20 Torr, of not more than 160 grams 3MS per liter of bed of the sorbent material; and (vi) Heel, measured for gaseous ethane ($C_2H_4$) at 21° C. at 25 Torr, of not more than 10 grams ethane per liter of bed of the sorbent material.

37 Claims, 9 Drawing Sheets

FLUID STORAGE AND DELIVERY SYSTEM UTILIZING LOW HEELS CARBON SORBENT MEDIUM

BACKGROUND OF THE INVENTION

1. Field of the Invention

This invention relates generally to storage and dispensing systems for the selective dispensing of fluids from a vessel or storage container in which the fluid component(s) are held in sorptive relationship to a solid carbon sorbent medium having low adsorption Heels, and are desorptively released from the carbon sorbent medium in the dispensing operation.

2. Description of the Related Art

In a wide variety of industrial processes and applications, there is a need for a reliable source of process fluid(s).

Such process and application areas include semiconductor manufacturing, ion implantation, manufacture of flat panel displays, medical intervention and therapy, water treatment, emergency breathing equipment, welding operations, space-based delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knoilmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency, as well as safety concerns.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, which overcomes the above-discussed disadvantages of the gas supply process disclosed in the Knollmueller patent. The gas storage and dispensing system of the Tom et al. patent comprises an adsorption-desorption apparatus, for storage and dispensing of a gas, e.g., a gas selected from the group consisting of hydride gases, halide gases, and organometallic Group V compounds, including: a storage and dispensing vessel constructed and arranged for holding a solid-phase physical sorbent medium, and for selectively flowing gas into and out of said vessel; a solid-phase physical sorbent medium disposed in said storage and dispensing vessel at an interior gas pressure; a sorbate gas physically adsorbed on the solid-phase physical sorbent medium; a dispensing assembly coupled in gas flow communication with the storage and dispensing vessel, and constructed and arranged to provide, exteriorly of the storage and dispensing vessel, a pressure below said interior pressure, to effect desorption of sorbate gas from the solid-phase physical sorbent medium, and gas flow of desorbed gas through the dispensing assembly.

The storage and dispensing vessel of the Tom et al. patent embodies a substantial advance in the art, relative to the prior art use of high pressure gas cylinders. Conventional high pressure gas cylinders are susceptible to leakage from damaged or malfunctioning regulator assemblies, as well as to rupture if internal decomposition of the gas leads to rapid increasing interior gas pressure in the cylinder and the risk of cylinder rupture or other unwanted bulk release of gas from the cylinder. The gas storage and dispensing vessel of the Tom et al. patent reduces the pressure of stored sorbate gases by reversibly adsorbing them onto a carrier sorbent medium such as a zeolite or activated carbon material.

The efficiency of the fluid storage and delivery system of the Tom et al. patent is directly affected by the sorbent material employed therein. Therefore, there is a continuing need in the art to identify and utilize improved sorbent materials in such fluid storage and delivery systems, and it is accordingly an object of the present invention to provide a fluid storage and dispensing system utilizing a high efficiency sorbent material which offers significant advantages in cost, ease of use, and performance characteristics.

SUMMARY OF THE INVENTION

The present invention contemplates a system for storage and dispensing of a sorbable fluid, e.g., a gas, vapor, liquid, multiphase fluid, etc., including fluid mixtures as well as single component fluids.

In one aspect, the invention relates to an adsorption-desorption apparatus, which comprises a storage and dispensing vessel for holding a low Heel carbon sorbent medium therein at an interior gas pressure, a sorbable fluid physically adsorbed on said low Heel carbon sorbent medium; and a dispensing assembly coupled in gas flow communication with the storage and dispensing vessel and arranged for dispensing from the vessel sorbable fluid desorbed from the solid-phase carbon sorbent medium.

The term "Heel" is defined herein as the amount of residual sorbate fluid (in grams) that is retained by a sorbent material after desorption, under a certain pressure and at a certain temperature, per unit volume (in liters) of bed of the sorbent material, which is considered irremovable or disproportionately difficult to remove from the sorbent material. This portion of sorbate fluid constitutes waste and reduces the sufficiency of the fluid storage and dispensing system.

The phrase "low Heel" as used in the present application is defined as being characterized by at least one of the following: (i) Heel, measured for gaseous arsine ($AsH_3$) at 20° C. at 20 Torr, of not more than 50 grams $AsH_3$ per liter of bed of the sorbent material; (ii) Heel, measured for gaseous boron trifluoride ($BF_3$) at 20° C. at 20 Torr, of not more than 20 grams boron trifluoride per liter of bed of the sorbent material; (iii) Heel, measured for gaseous germanium tetrafluoride ($GeF_4$) at 20° C. at 20 Torr, of not more than 250 grams $GeF_4$ per liter of bed of the sorbent material; (iv) Heel, measured for gaseous arsenic pentafluoride ($AsF_5$) at 20° C. at 20 Torr, of not more than 700 grams $AsF_5$ per liter of bed of the sorbent material; (v) Heel, measured for gaseous trimethyl silane (3MS) at 20° C. at 20 Torr, of not more than 160 grams 3MS per liter of bed of the sorbent material; and (vi) Heel, measured for gaseous ethane ($C_2H_6$) at 21° C. at 25 Torr, of not more than 10 grams ethane per liter of bed of the sorbent material.

Preferably, the carbon sorbent material employed by the present invention has both a low Heel and a high Sorbent Working Capacity.

The phrase "Sorbent Working Capacity" ($C_w$) is defined herein as the amount of sorbate fluid (in grams) originally loaded on the sorbent medium that is removable from the sorbent medium in the fluid dispensing operation, when the pressure is reduced from a higher pressure to a lower pressure at a certain temperature. For example, the Sorbent Working Capacity per unit volume (in liters) of the sorbent material, when the pressure decreases from 650 Torr to 20 Torr at 20° C., is illustrated by the following equation:

$$C_W = \frac{\text{Amount of Sorbate Originally Loaded (at 650 Torr)} - \text{Heel (at 20 Torr)}}{\text{Volume of Sorbent Material}} \text{ (at 20° C.)}$$

As used in such determination, the sorbent material volume is the volume of a bed of the sorbent material.

The phrase "high Sorbent Working Capacity" as used in the present application is defined as being characterized by at least one of the following: (i) Sorbent Working Capacity, measured for gaseous arsine ($AsH_3$) at 20° C from 650 Torr to 20 Torr, of at least 260 grams $AsH_3$ per liter of bed of the sorbent material; (ii) Sorbent Working Capacity, measured for gaseous boron trifluoride ($BF_3$) at 20° C. from 650 Torr to 20 Torr, of at least 50 grams of $BF_3$ per liter of bed of the sorbent material; (iii) Sorbent Working Capacity, measured for gaseous germanium tetrafluoride ($GeF_4$) at 20° C. from 650 Torr to 20 Torr, of at least 350 grams $GeF_4$ per liter of bed of the sorbent material; (iv) Sorbent Working Capacity, measured for gaseous arsenic pentafluoride ($AsF_5$) at 20° C. from 650 Torr to 20 Torr, of at least 150 grams $AsF_5$ per liter of bed of the sorbent material; and (v) Sorbent Working Capacity, measured for gaseous trimethyl silane (3MS) at 20° C. from 650 Torr to 20 Torr, of at least 70 grams 3MS per liter of bed of the sorbent material.

Another aspect of the present invention relates to an adsorption-desorption apparatus as described hereinabove, which comprises a carbon sorbent medium having low sorption waste rate.

The term "sorption waste rate" is defined herein as the percentage of a sorbate fluid that is irremovably retained by the sorbent medium after desorption (i.e. Heel), over the total amount of such sorbate fluid that is originally loaded on the sorbent medium before desorption, when the pressure decreases from a higher pressure to a lower pressure at a certain temperature. The sorption waste rate ($R_w$), when measured from 650 Torr to 20 Torr at 20° C., is illustrated by the following equation:

$$R_W = \frac{\text{Heel (at 20 Torr)}}{\text{Sorbate Working Capacity (from 650 Torr to 20 Torr)} + \text{Heel (at 20 Torr)}} \text{ \% (at 20° C.)}$$

The phrase "low sorption waste rate" as used in the present application is defined as being characterized by at least one of the following: (i) sorption waste rate, measured for arsine ($AsH_3$) at 20° C. from 650 Torr to 20 Torr, of not more than 20% (preferably of not more than 15%, and more preferably of not more than 12%); (ii) sorption waste rate, measured for boron trifluoride ($BF_3$) at 20° C. from 650 Torr to 20 Torr, of not more than 38%; (iii) sorption waste rate, measured for germanium tetrafluoride ($GeF_4$) at 20° C. from 650 Torr to 20 Torr, of not more than 40% (preferably of not more than 35%, and more preferably of not more than 30%); (iv) sorption waste rate, measured for arsenic pentafluoride ($AsF_5$) at 20° C. from 650 Torr to 20 Torr, of not more than 75% (preferably of not more than 70%); and (v) sorption waste rate, measured for trimethyl silane (3MS) at 20° C. from 650 Torr to 20 Torr, of not more than 60% (preferably of not more than 55%, and more preferably of not more than 45%).

The carbon sorbent material useful in the adsorption-desorption apparatus of the present invention can have any suitable size, shape, and conformation, including bead, granules, pellets, tablets, powders, particulates, extrudates, cloth or web form materials, honeycomb matrix monolith, composites of the carbon sorbent with other components, as well as comminuted or crushed forms of the foregoing conformations. Preferably such carbon sorbent materials comprise bead carbon particles of a highly uniform spherical shape.

The apparent density of the carbon sorbent material employed by the present invention is preferably less than 0.5 g/cc. The ash content is preferably below about 6% by weight, based on the total weight of the carbon sorbent material, prefereably below 1%, more preferably below about 0.1%, and most preferably about 0%.

Moisture contained by the carbon sorbent material may decompose the sorbate fluid in the storage and dispensing system of the present invention and therefore causes undesirable waste of the sorbate as well as lead to pressure rise within the storage and dispensing vessel. Therefore, the carbon sorbent material employed by the present invention desirably has moisture content of not more than 0.04% by weight, and more preferably 0%.

The dispensing assembly of the adsorption-desorption apparatus of the present invention is coupled with the storage and dispensing vessel in gas flow communication and arranged for dispensing from said vessel sorbable fluid desorbed from the solid-phase low Heel carbon sorbent medium. Such dispensing assembly may be constructed and arranged to provide, exteriorly of the storage and dispensing vessel, a pressure below the interior pressure, to effect pressure differential desorption of fluid from the solid-phase low Heel carbon sorbent medium, and fluid flow of desorbed fluid through the dispensing assembly.

Alternatively, the dispensing assembly may comprise means for selectively heating the low Heel carbon sorbent material, to effect thermal desorption of the fluid from such carbon sorbent medium, and flow of the thermally desorbed fluid through the dispensing assembly.

As a further alternative, the dispensing assembly may be constructed and arranged to effect a combination of thermal and pressure differential desorption of the fluid from the solid-phase low Heel carbon sorbent medium.

In yet another alternative arrangement, the dispensing assembly may be arranged to flow a carrier fluid therethrough, so that the resultant mass transfer gradient effects desorption of the sorbate fluid from the carbon sorbent medium, to thereby dispense the sorbate fluid as a component of the carrier fluid stream discharged from the vessel.

The dispensing assembly of the present invention may comprise any appropriate means, including without limitation, conduits, pipes, tubing, flow channels, valving, instrumentation, monitoring means, flow regulators, flow controllers, pumps, blowers, ejectors, eductors, aspirators, or the like, as appropriate to the specific end use application of the fluid storage and dispensing assembly of the present invention. The fluid storage and dispensing vessel may be of any suitable size and shape, e.g., a generally cylindrical vessel having an interior volume on the order of from about 0.10 liter to about 100 liters, more preferably in the range of from about 1 liter to about 50 liters.

The interior pressure in the sorbent-containing vessel of the adsorption-desorption apparatus of the invention is below about 1200 Torr. Preferably, the pressure is below 800 Torr, and most preferably below 700 Torr. By providing sub-atmospheric pressure of the sorbed fluid in the storage and dispensing vessel, the risk of leaks and bulk dispersion of the sorbate fluid to the ambient environment is obviated, in contrast to the prior art practice where high pressure containment of the fluid entails a constant and significant risk, and corresponding safety and handling issue.

Another aspect of the present invention relates to a fluid storage and dispensing system comprising a vessel constructed and arranged for holding a physical carbon adsorbent medium having fluid adsorbed thereon, wherein said vessel includes a port having dispensing means associated therewith for controllably dispensing fluid desorbed from the physical adsorbent medium in a dispensing mode of operation of said system, wherein said physical adsorbent medium comprises a low Heel carbon sorbent as described hereinabove. Preferably, such low Heel carbon sorbent is also characterized by a high Sorbate Working Capacity.

The present invention in another aspect relates to a process for supplying a fluid reagent on demand to a fluid-utilizing facility, comprising:

providing a storage and dispensing vessel containing a low Heel solid-phase carbon sorbent medium having a physically sorptive affinity for said fluid reagent;

physically sorptively adsorbing the fluid reagent on the low Heel carbon sorbent medium at an interior gas pressure to yield a sorbate fluid-retaining carbon sorbent medium;

desorbing the fluid reagent from the sorbate fluid-retaining low Heel carbon sorbent medium; and dispensing the desorbed fluid reagent from said fluid storage vessel.

The low Heel carbon sorbent medium preferably has a high Sorbent Working Capacity.

The low Heel, high Sorbent Working Capacity carbon sorbent material employed in the practice of the invention desirably has the characteristic of readily sorbing the sorbate fluid in the first instance, at suitably high rate, and correspondingly releasing the previously sorbed fluid in a rapid manner in response to (1) a pressure differential between the interior volume of the storage and dispensing vessel and an exterior locus at lower pressure, (2) heating of the carbon sorbent material, and/or (3) flow of a carrier fluid in contact with the carbon sorbent material having sorbed fluid thereon, when the adsorption-desorption apparatus of the present invention is in a fluid dispensing mode of operation.

The carbon sorbent material employed by the present invention demonstrates low Heels and high Sorbent Working Capacity for various sorbate fluids, including but not limited to, arsine ($AsH_3$), boron trifluoride ($BF_3$), germanium tetrafluoride ($GeF_4$), arsenic pentafluoride ($AsF_5$), and trimethyl silane (3MS).

Conventional carbon sorbents, due to their structural limitations, have very high Heels and low Sorbent Working Capacity for these sorbate fluids, which results in undesirable waste and unsatisfactorily low efficiency in transporting and delivering such fluids.

Comparatively, the carbon sorbent material employed by the present invention shows significant advantages over conventional carbon materials in lowering irremovable Heels and concurrently enhancing overall Sorbent Working Capacity, thereby markedly reducing the associated sorption waste rates and increasing the industrial efficiency of the fluid storage and delivery system.

Although the adsorption-desorption apparatus of the present invention is described hereinafter primarily with reference to dispensing fluid from the vessel by pressure differential desorption under a constant temperature, such as room temperature (e.g., ~25° C.), it will be appreciated that it may also effect dispensing of fluid by thermally desorbing the fluid from the carbon sorbent material on which it previously has been sorbed. Alternatively, the desorption of the sorbate fluid from the carbon sorbent medium on which it is loaded may be usefully carried out with a combination of pressure differential and thermally-mediated release of the sorbate fluid from the sorbent medium.

The choice of the specific modality of desorption, e.g., pressure differential, thermal, and/or flow-through of carrier fluid, and the appertaining process conditions therefor may readily be selected and determined by the skilled artisan without undue experimentation, based on the nature of the sorbent material, the specific sorbate fluid, and the particular end use application in which the desorbed fluid is to be employed.

Heating means may be operatively arranged in relation to the storage and dispensing vessel for selective heating of the carbon sorbent material, to effect thermally-enhanced desorption of the sorbate gas from the carbon sorbent material. The heating means may include electrical resistance heating elements, extended heat transfer surface members, radiative heating members, or other thermal actuatable heating means disposed in the sorbent bed in the storage and dispensing vessel, or otherwise arranged for transfer or in situ generation of heat to the sorbent material, to effect elevation of the temperature of the sorbent, and desorption of the sorbate fluid.

Additional methods of modifying the carbon sorbent material may be variously employed in the broad practice of the invention to lower the Heel and to increase the Sorbent Working Capacity of said carbon sorbent material, including applying a sorption-enhancing material on the surface (including the interior pore surfaces) of the sorbent material. For example, an adsorption-enhancing liquid, solid, or semi-solid material may be applied to the carbon sorbent material, to further improving its surface property. More specifically, the carbon sorbent material may be fluorinated for more efficient absorption-desorption delivery of arsenic pentafluoride ($AsF_5$) gas, which will lower the Heel by more than 17% and increase the Sorbent Working Capacity by more than 35%.

Other aspects, features and embodiments of the invention will be more fully apparent from the ensuing disclosure and appended claims.

DETAILED DESCRIPTION OF THE INVENTION, AND PREFERRED EMBODIMENTS THEREOF

Figure 1:
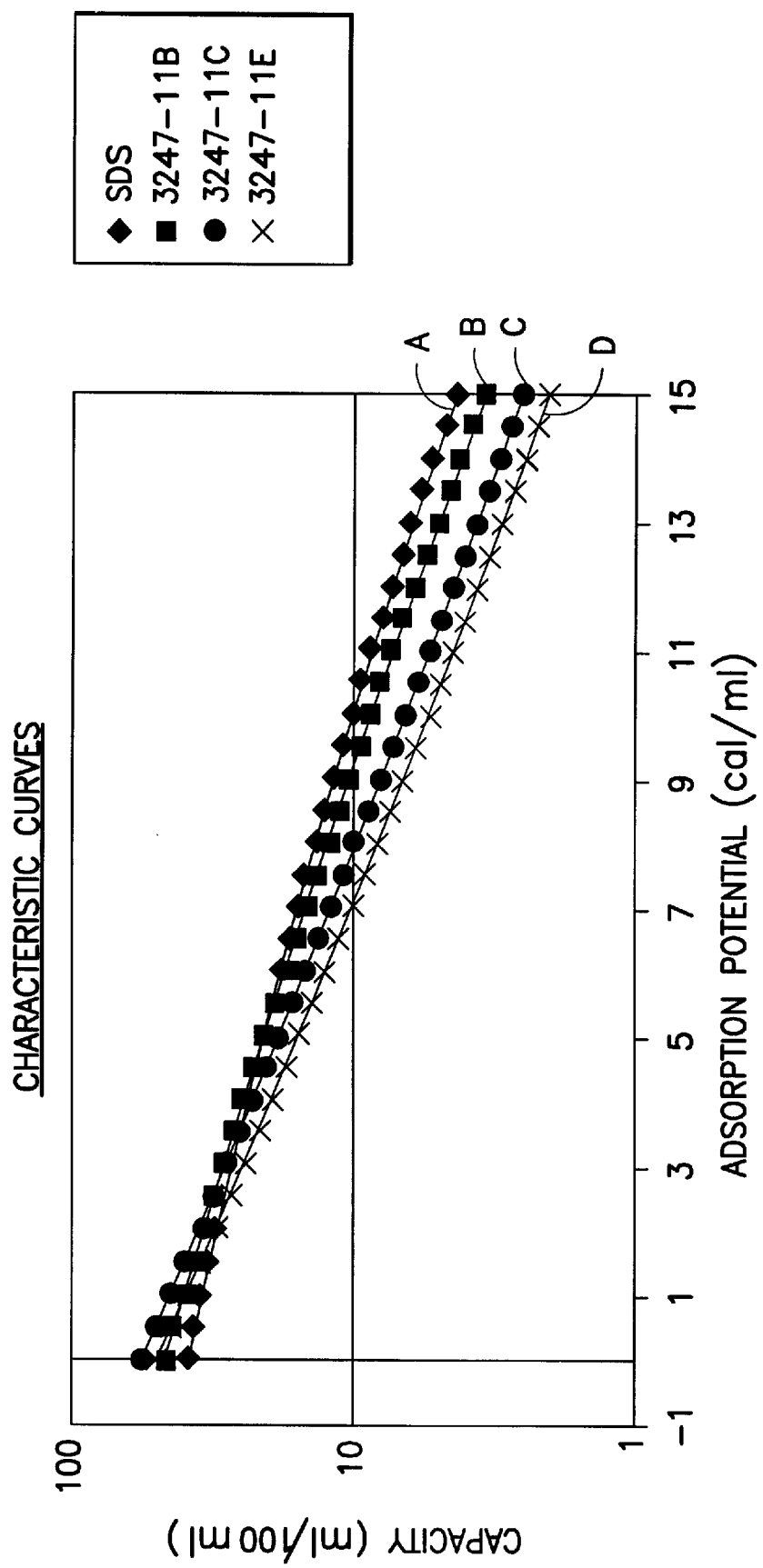
FIG. 1 is a graph of adsorption characteristic curves for various carbon sorbent materials, as a plot of logarithm of Sorbent Loading Capacity of the sorbent material, indicating total volume (in milliliters) of sorbate fluid adsorbed by every hundred milliliters of such sorbent material, as a function of Adsorption Potential (cal/ml). Curve A indicates Loading Capacity response of a conventionally used carbon sorbent material, and Curves B, C, and D represent Loading Capacity response of three kinds of new carbon sorbent materials that are advantageously employed in the broad practice of the present invention.

The disclosure of U.S. Pat. No. 5,518,528 issued May 21, 1996 is hereby incorporated herein by reference in its entirety.

The present invention provides a low-pressure adsorption-desorption apparatus as a source fluid supply means, e.g., for applications such as ion implantation of hydride and halide gases, and organometallic Group V compounds. Illustrative examples of the foregoing include arsine, phosphine, silicon tetrafluoride, arsenic pentafluoride, germanium tetrafluoride, trimethyl silane, chlorine, diborane ($B_2H_6$ and its deuterium analog), nitrogen trifluoride, boron trifluoride, boron trichloride, hydrochloride, hydrobromide, hydrofluoride, hydroiodide, and tungsten hexafluoride.

As used herein, the term "low pressure" means a pressure not substantially exceeding 1 atmosphere, e.g., a pressure $\leq 1.25$ atmosphere, more preferably a pressure $\leq 1.0$ atmosphere, and most preferably a pressure within the range of from about 0.15 to about 0.8 atmosphere.

It will be recognized that the adsorption-desorption apparatus of the present invention may be operated at higher pressures than in the above-described low pressure regime, within the broad practice of the invention. The adsorption-desorption apparatus, however, has particular utility in applications in which the fluid is employed at sub-atmospheric pressure, as for example in ion implantation applications. In such end usage, the apparatus of the invention permits fluid to be stored and dispensed at low pressure.

By such low-pressure operation, the apparatus of the invention obviates the necessity in many applications for high-pressure fluid vessels of the prior art that heretofore have been used in such applications. Particularly where hazardous gases are involved, the use of high-pressure vessels entails an enhanced risk of leakage and harm to persons and/or property, relative to the low-pressure adsorption-desorption apparatus of the present invention, where the fluid medium may be stored at near-ambient pressure levels, and dispensed in a ready and controllable manner.

The adsorption-desorption apparatus of the invention comprises a leak-tight vessel, such as a gas cylinder, containing the fluid to be dispensed, e.g., arsine, boron trifluoride, germane, etc., adsorbed into a sorbent material comprising a reactivated carbon adsorbent material. In the case of gaseous sorbates, such as arsine and phosphine, the reactivated carbon sorbent reduces the vapor pressure of the sorbate gas to $\leq 1$ atmosphere.

While the invention is discussed primarily hereinafter in terms of the storage and delivery of arsine, boron trifluoride, arsenic pentafluoride, germanium tetrafluoride, and trimethyl silane gases, it will be recognized that the utility of the present invention is not thus limited, but rather extends to and is inclusive of a wide variety of other gases. Illustrative examples include ethane, phosphine, silicon tetrafluoride, chlorine, diborane ($B_2H_6$ and its deuterium analog), phosgene, germane, ammonia, stibine, nitrogen trifluoride, boron trichloride, hydrochloride, hydrobromide, hydrofluoride, hydroiodide, tungsten hexafluoride, organo compounds, and organometallic Group V compounds.

The means and method of the present invention for storing and delivering fluids at $\leq 0$ psig greatly reduces the hazard posed by these fluids. The inventive technique involves the adsorption of these fluids into a solid-phase carbon sorbent with low Heels and high Sorbent Working Capacity. By physically adsorbing the fluid into such carbon sorbent, the vapor pressure of the fluid can be reduced to $\leq 0$ psig. The release potential of the fluid is greatly reduced as the driving force of pressure is eliminated.

The present invention utilizes commercially available carbon sorbent materials in a wide variety of sizes. shapes, surface areas, and compositions, to provide an effective fluid supply system that obviates the dangers, deficiencies, and disadvantages of the prior art practice of supplying process gases and fluid reagents from pressurized cylinders.

The prior art has utilized gas cylinders extensively, for supplying welding gases, anesthesia gases, oxygen, chemical process reagent gases, etc., and has used cylinder vessels with extremely thick walls to contain the high pressures involved, since the cylinders' supply capacity (amount of dispensable fluid) is a function of the pressure level in the cylinder, and increased pressure levels are consistent with increased cylinder dispensing capacity.

The present invention, by utilizing a carbon sorptive medium, avoids the process difficulties of the prior art, which includes the risk of high pressure gas cylinder rupture, the risk of overpressure from decomposition of gases in situ, and the difficulties associated with monitoring and regulating very high pressure gases. The sorptive medium of the invention permits ready storage of the fluid and easily effected pressure differential, concentration differential and/or thermal desorption dispensing.

Although conventional carbon material disclosed in U.S. Pat. No. 5,704,967 for "Fluid Storage and Delivery System Comprising High Work Capacity Physical Sorbent" and U.S. Pat. No. 5,704,965 for "Fluid Storage and Delivery System Utilizing Carbon Sorbent Medium" offers high Sorbent Working Capacity for certain gases such as arsine, phosphine, boron trifluoride, and silicon tetrafluoride, it has unsatisfactorily high Heels, which result in high waste of the sorbate gases and reduce overall fluid delivery efficiency.

In order to increase the delivery efficiency, carbon materials of low Heels are advantageously employed by the present invention.

Commercially available low Heel carbon sorbent materials, which may be reactivated and are preferred in the broad practice of the invention include carbon materials available from Kureha Corporation of America, New York, N.Y.

Other commercial sources for carbon sorbent materials, which may be useful in the broad practice of the present invention include Westvaco Corporation, New York, N.Y.; and Calgon Corporation, Pittsburgh, Pa.

Following tables 1, 2, 3, 4, and 5 compare the Heels and the Sorbent Working Capacities of the low Heel carbon sorbent materials with those of a conventional activated carbon sorbent (designated as SDS).

TABLE 1

Adsorption Data for Arsine $(AsH_3)$[1]

| Adsorbent | Heels | | Sorbent Working Capacity | | Waste Rate | |
|---|---|---|---|---|---|---|
| | g/L | % difference (against SDS) | g/L | % difference (against SDS) | % | % difference (against SDS) |
| SDS | 74 | 0.00 | 264 | 0.00 | 21.9 | 0.00 |
| 3247-11B | 48 | −34.67 | 234 | −11.37 | 17.0 | −22.37 |
| 3247-11C | 31 | −57.62 | 204 | −22.58 | 13.2 | −39.73 |
| 3247-11E | 27 | −63.06 | 191 | −27.82 | 12.4 | −43.38 |
| WVA-1500 | 34 | −54.05 | 281 | 6.44 | 10.8 | −50.68 |

[1]Heels measured at 20° C. at 20 Torr, and Sorbent Working Capacity measured at 20° C. from 650 Torr to 20 Torr.

The low Heel carbon sorbent material employed by the present invention therefore is preferably characterized by a Heel, measured for arsine at 20° C. at 20 Torr, of not more than 50 grams, more preferably not more than 40 grams, and most preferably not more than 35 grams, per liter of bed of the sorbent material.

It is also preferred that such low Heel carbon sorbent material is characterized by a Sorbent Working Capacity, measured for arsine at 20° C. from 650 Torr to 20 Torr, of at least 260 grams per liter of bed of the sorbent material. More preferably, the Sorbent Working Capacity for arsine is at least 280 grams per liter of bed of the sorbent material.

The low Heel carbon sorbent material may also have a sorption waste rate of less than 20% for arsine, measured at 20° C. from 650 Torr to 20 Torr. Preferably, such sorption waste rate is not more than 15%, and more preferably not more than 12%.

TABLE 2

Adsorption Data for Boron Trifluoride $(BF_3)$[2]

| Adsorbent | Heels | | Sorbent Working Capacity | | Waste Rate | |
|---|---|---|---|---|---|---|
| | g/L | % difference (against SDS) | g/L | % difference (against SDS) | % | % difference (against SDS) |
| SDS | 42.0 | 0.00 | 64.6 | 0.00 | 39.4 | 0.00 |
| 3247-11C | 15.9 | −62.07 | 36.4 | −43.56 | 37.6 | −4.57 |

[2]Heels measured at 20° C. at 20 Torr, and Sorbent Working Capacity measured at 20° C. from 650 Torr to 20 Torr.

Preferred low Heel carbon sorbent material employed in the practice of the present invention may have a Heel, measured for boron trifluoride ($BF_3$) at 20° C. at 20 Torr, of not more than 20 grams, or a Sorbent Working Capacity, measured for $BF_3$ at 20° C. from 650 Torr to 20 Torr, of at least 50 grams. More preferably, such carbon sorbent material is characterized by a sorption waste rate, measured for $BF_3$ at 20° C. from 650 Torr to 20 Torr, of not more than 38%.

The low Heel carbon sorbent material employed by the present invention may also have a Heel, measured for $AsF_5$ at 20° C. at 20 Torr, within the following ranges: (1) not more than 700 grams, (2) not more than 600 grams, (3) not more than 500 grams, (4) not more than 400 grams, and (5) not more than 100 grams, per liter of bed of the sorbent material.

TABLE 3

Adsorption Data for Germanium Tetrafluoride ($GeF_4$)[3]

| Adsorbent | Heels | | Sorbent Working Capacity | | Waste Rate | |
|---|---|---|---|---|---|---|
| | g/L | % difference (against SDS) | g/L | % difference (against SDS) | % | % difference (against SDS) |
| SDS | 275 | 0.00 | 346 | 0.00 | 44.28 | 0.00 |
| 3247-11B | 206 | −24.92 | 370 | 6.99 | 35.76 | −19.02 |
| 3247-11C | 157 | −43.02 | 350 | 1.22 | 30.97 | −30.06 |
| 3247-11E | 134 | −51.09 | 336 | −2.72 | 28.51 | −35.61 |
| WVA-1500 | 172 | −37.56 | 199 | −42.43 | 46.36 | 4.70 |

[3]Heels measured at 20° C. at 20 Torr and Sorbent Working Capacity measured at 20° C. from 650 Torr to 20 Torr.

The low Heel carbon sorbent material preferred by the present invention can further be characterized by a Heel, measured for $GeF_4$ at 20° C. at 20 Torr, of not more than 250 grams, more preferably not more than 200 grams, and most preferably not more than 150 grams, per liter of bed of the sorbent material.

Such low Heel carbon sorbent material can also be characterized by a Sorbent Working Capacity, measured for arsine at 20° C. from 650 Torr to 20 Torr, of at least 350 grams per liter of bed of the sorbent material. More preferably, the Sorbent Working Capacity for arsine is at least 370 grams per liter of bed of the sorbent material.

The low Heel carbon sorbent material may further have a sorption waste rate of less than 40% for $GeF_4$, measured at 20° C. from 650 Torr to 20 Torr. Preferably, such sorption waste rate is not more than 35%, and more preferably not more than 30%.

Such low Heel carbon sorbent material can also be characterized by a Sorbent Working Capacity, measured for $AsF_5$ at 20° C. from 650 Torr to 20 Torr, of at least 150 grams per liter of bed of the sorbent material. More preferably, the Sorbent Working Capacity for arsine is at least 200 grams per liter of bed of the sorbent material, and most preferably, such Sorbent Working Capacity is at least 240 grams.

The sorption waste rate of such low Heel carbon sorbent material is preferably less than 75% for $AsF_5$, measured at 20° C. from 650 Torr to 20 Torr. More preferably, it is not more than 70%, and most preferably not more than 50%.

TABLE 4

Adsorption Data for Arsenic Pentafluoride ($AsF_5$)[4]

| Adsorbent | Heels | | Sorbent Working Capacity | | Waste Rate | |
|---|---|---|---|---|---|---|
| | g/L | % difference (against SDS) | g/L | % difference (against SDS) | % | % difference (against SDS) |
| SDS | 765 | 0.00 | 119 | 0.00 | 86.54 | 0.00 |
| 126A | 21 | −97.25 | 177 | 53.91 | 10.61 | −87.74 |
| 126C | 16 | −97.91 | 165 | 43.48 | 8.84 | −89.79 |
| 3247-11C | 662 | −13.46 | 243 | 113.04 | 73.15 | −15.47 |
| 3247-11E | 545 | −28.76 | 239 | 100.84 | 69.51 | −19.68 |
| WVA-1500 | 460 | −40.52 | 154 | 29.41 | 74.92 | −13.43 |

[4]Heels measured at 20° C. at 20 Torr, and Sorbent Working Capacity measured at 20° C. from 650 Torr to 20 Torr.

TABLE 5

Adsorption Data for Trimethyl Silane (3MS)[5]

| Adsorbent | Heels | | Sorbent Working Capacity | | Waste Rate | |
|---|---|---|---|---|---|---|
| | g/L | % difference (against SDS) | g/L | % difference (against SDS) | % | % difference (against SDS) |
| SAGE | 169 | 0.00 | 39 | 0.00 | 81.25 | 0.00 |
| 3247-11C | 158 | −6.45 | 123 | 213.81 | 56.23 | −30.79 |
| WVA-1500 | 83 | −50.68 | 120 | 206.91 | 40.89 | −49.67 |
| Maxsorb 19 | 107 | −36.89 | 73 | 85.68 | 59.44 | −26.84 |

[5]Heels measured at 20° C. at 20 Torr, and Sorbent Working Capacity measured at 11° C. 650 Torr to 20 Torr.

Additionally, the low Heel carbon sorbent material of the present invention is characterized by a Heel, measured for 3MS at 20° C. at 20 Torr, of not more than 160 grams per liter of bed of the sorbent material. More preferably, the Heel for 3MS is not more than 110 grams per liter of bed of the sorbent material, and most preferably not more than 100 grams.

The Sorbent Working Capacity of such low Heel carbon sorbent material is preferably at least 70 grams per liter of bed of the sorbent material, measured for 3MS at 20° C. from 650 Torr to 20 Torr, and more preferably at least 100 grams, and most preferably at least 120 grams.

Such low Heel carbon sorbent material is also preferably characterized by a sorption waste rate of not more than 60%, measured for 3MS at 20° C. from 650 Torr to 20 Torr. More preferably, the sorption waste rate of such low Heel carbon sorbent material is not more than 55%, and most preferably not more than 45%.

The low Heel carbon sorbent used in the adsorption-desorption apparatus of the present invention may have any suitable size, shape and conformation appropriate to the end use application and the specific sorbate fluid species involved. The carbon sorbent material may for example be in the form of beads, granules, pellets, tablets, powders, particulates, extrudates, cloth or web form materials, honeycomb matrix monolith, composites (of the carbon sorbent with other components), or comminuted or crushed forms of the foregoing conformations. Preferably the carbon sorbent material will be in the form of beads with highly uniform diameter spherical shape.

In one embodiment, the adsorption-desorption apparatus of the present invention may comprise a standard gas cylinder, and a cylinder valve or other flow dispensing assembly (regulators, monitors, sensors, flow directing means, pressure controllers, mass flow controllers, piping, valving, instrumentation, automatic start and shut-off devices, etc.) coupled to the cylinder, with the cylinder holding the carbon sorbent material. The cylinder is subsequently filled, e.g., to 1 atmosphere pressure, with a sorbate fluid such as hydride gas.

Fluid flow from the adsorption-desorption apparatus of the invention by pressure differential desorption may be readily carried out by utilizing a pressure differential between the pressure in the interior volume of the sorbent-containing vessel and a lower pressure exterior to the vessel, so that fluid is desorbed from the sorbent material in the vessel and flowed through the dispensing assembly.

For example, the sorbent-containing vessel may hold a reagent gas at a sub-atmospheric pressure, e.g., 650 Torr, for use in an ion implantation process, where the ion implant chamber is maintained under vacuum conditions, or alternatively at low pressure, e.g., below 100 Torr, below the pressure of the interior volume in the storage and dispensing vessel. As a result, the reagent gas will desorb from the low Heel carbon sorbent in the vessel and flow to the ion implant chamber, when gas flow communication is established between the ion implant chamber and the storage and dispensing vessel containing the sorbate reagent gas. The adsorption-desorption apparatus thus effects flow of the reagent gas through the connecting piping, valving and instrumentation, and is readily controllable at a desired flow rate. Utilizing a device such as a mass flow controller, a constant flow can be achieved as the sorbent vessel pressure decreases with continued dispensing operation.

Additionally, or alternatively, the fluid dispensing assembly of the adsorption-desorption apparatus of the invention may include means for heating the carbon sorbent material, to thermally desorb sorbate fluid therefrom. Such heating means may include any suitable heat transfer or heat exchange devices, structures or apparatus, which are operatively associated with the sorbent material to effect heating thereof, for thermal desorption of the sorbate from the sorbent medium. Thus, the present invention contemplates heat- and/or pressure-mediated dispensing of sorbate fluid from the sorbent on which same is stored.

As a still further alternative, a carrier fluid, e.g., an inert carrier gas such as argon, helium, or the like, may be flowed through the interior volume of the vessel, so that the resultant concentration gradient effects desorption and passage of the desorbed reagent into the carrier medium, for discharge from the vessel as a multicomponent fluid containing the reagent as a component thereof.

Referring now to the drawings, FIG. 1 is a graph of adsorption characteristic curves for various carbon sorbent materials. A characteristic curve, according to Polanyi's potential theory, is plotted with the volume of sorbate material adsorbed by unit mass of sorbent as a function of adsorption potential (E), which is a variable determined by several factors including the physical and chemical properties of the sorbate and sorbent material, the temperature, the equilibrium vapor pressure of the sorbate in gas phase, and the partial pressure of the sorbate in the adsorbed phase.

In FIG. 1, the volume of sorbate material adsorbed by the sorbent is represented by the Loading Capacity measured in milliliters of sorbate fluid adsorbed by each successive increment of 100 milliliters of sorbent material. The logarithm of such Loading Capacity in ml/100 ml increments exhibits a negative linear correlation with Adsorption Potential, as shown in FIG. 1. Curve A is the characteristic curve of a conventional carbon sorbent material SDS, and curves B, C, and D are each characteristic curves of low Heel carbon sorbents (i.e. reactivated carbons 3247-11B, 3247-11C, and 3247-11E) that are useful for the practice of the present invention.

For a particular type of sorbate, if the temperature and pressure are known, the Adsorption Potential at that temperature and pressure can be readily calculated, and the corresponding Loading Capacity can resultantly be established using a plotted characteristic curve of a particular sorbent material. For a different sorbate adsorbed by the same sorbent material, the characteristic curves are the same except for an abscissa scale factor, which is a different value of the Adsorption Potential.

For example, for arsine gas absorbed at 650 Torr at 20° C., the Adsorption Potential will be 7.5 cal/ml; when the pressure is decreased to 20 Torr at the same temperature, the Adsorption Potential correspondingly increases to 17 cal/ml; for phosphine gas absorbed at 650 Torr at 20° C. and at 20 Torr at 20° C., the Adsorption Potential will have values of 10.3 cal/ml and 19.5 cal/ml, respectively. If the characteristic curve of the sorbent material has already been plotted, the Sorbent Working Capacity (which is the difference between the Loading Capacity at the lower Adsorption Potential end point value and the Loading Capacity at the higher Adsorption Potential end point value) and Heels (which is the Loading Capacity at the higher Adsorption Potential end point value) of these two sorbate material within the pressure differential range of 650 Torr and 20 Torr (each at 20° C.) can be easily calculated based on the plotted characteristic curve.

The shape of the characteristic curve is of essential importance. When the Adsorption Potentials of a particular type of sorbate within a certain range of pressure at a certain temperature are determined according to the Polanyi potential theory, the steeper the slope of the characteristic curve, the larger the corresponding Sorbent Working Capacity, and the lower the corresponding Heel will be.

As shown by FIG. 1, curves B, C, and D have steeper slopes than that of curve A.

By way of illustrative example, $GeF_4$, with an Adsorption Potential range of 5.5 to 12 cal/ml at 650 Torr at 20° C. and at 20 Torr at 20° C., the corresponding Sorbent Working Capacities on curves B, C, and D are larger than that on curve A, and the corresponding Heels on curves B, C, and D at the higher Adsorption Potential end point value, 12 cal/ml (not specifically shown on FIG. 1, but readily appreciated by extrapolation of the curves shown therein) is substantially lower than that on curve A.

The shape of the characteristic curve is determined by the structure of particular sorbent material. Pore size is one factor that significantly affects the shape of the characteristic curve of a particular sorbent. Carbon sorbent materials with larger pore sizes demonstrate characteristic curves of steeper slopes than those of carbon materials with smaller pore sizes.

Figure 2:
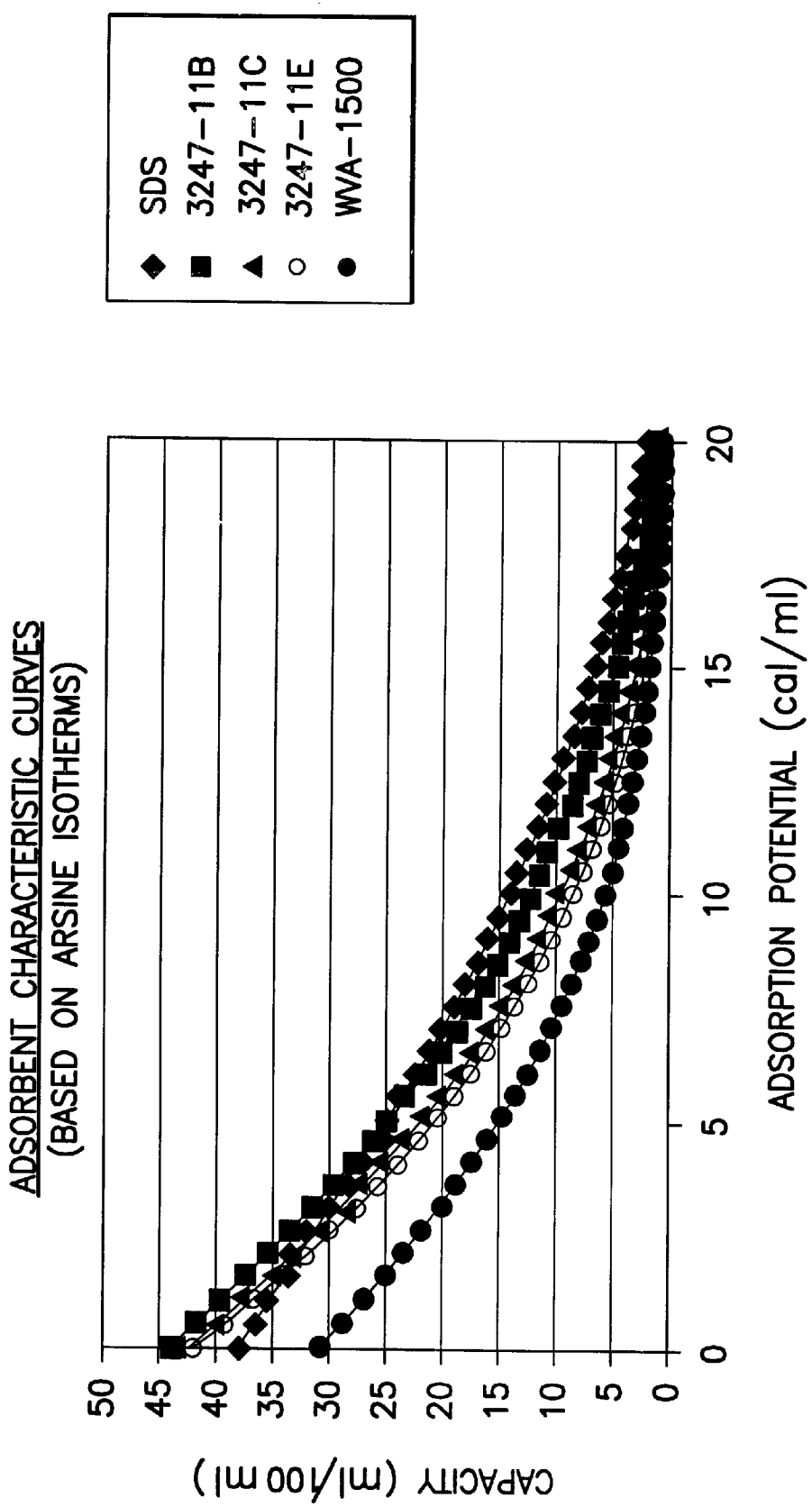
FIG. 2 is a graph of adsorption characteristic curves for various carbon sorbent materials, constructed based on arsine isotherms at 22° C., as a plot of logarithm of Sorbent Loading Capacity of the sorbent material, indicating total volume (in milliliters) of sorbate fluid adsorbed by every hundred milliliters of such sorbent material, as a function of Adsorption Potential (cal/ml).
Figure 3:
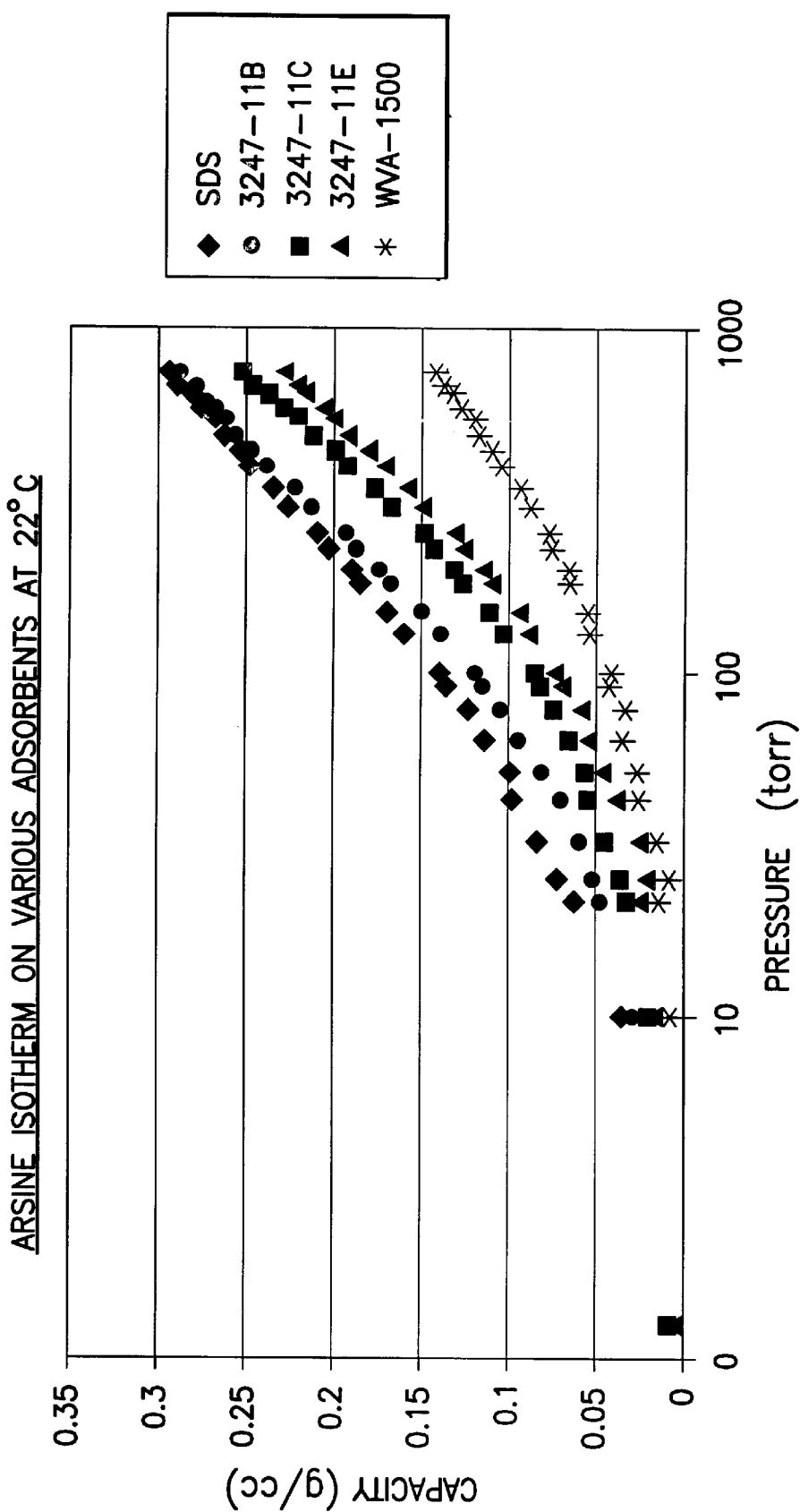
FIG. 3 is a graph of adsorption isotherms of various types of carbon sorbent materials for arsine at 22° C., as a plot of the Sorbent Loading Capacity of arsine, as a function of logarithm of the pressure in Torr.

FIG. 2 is another graph of adsorption characteristic curves for the carbon sorbent materials of FIG. 1, further including WVA-1500 carbon sorbent. Such characteristic curves are constructed based on arsine isotherms at 22° C. (as shown in FIG. 3). It is evident that the characteristic curve of the conventional activated carbon sorbent material SDS (plotted by ♦) has a slope less than those of the characteristic curves of the new carbon sorbent materials employed by the present invention.

FIG. 3 is the arsine isotherm measured at 22° C. for various carbon sorbent materials as described hereinabove.

The measurement is conducted using Micromeritics ASAP 2405 instrument, according to the following procedures:

(a) putting approximately 0.3 grams of adsorbent sample into a glass container;

(b) degassing the sample at 260° C. for 16 hours;

(c) recording the dry adsorbent sample weight after degassing;

(d) putting the sample container into a constant temperature bath;

(e) introducing a known amount of arsine gas into the sample container;

(f) measuring the equilibrium pressure in the sample container (i.e. when there is less than 0.1 Torr pressure change within 5 minutes);

(g) comparing the measured pressure with a predetermined pressure (i.e. the target pressure) and repeating steps (f) to (g), if necessary, until the difference between the measured pressure and the predetermined pressure is within less than 10% of the predetermined pressure;

(h) recording the measured pressure and the amount of arsine gas introduced into the sample;

(i) repeating steps (e) to (h) for various predetermined pressures;

(j) constructing the arsine isotherm based on the pressure and gas loading data.

The repeatability of the above measurement is generally within 5%.

Based on the arsine isotherms, one ordinarily skilled in the art can readily construct the characteristic curves of various carbon materials, using the following equation according to Polanyi theory:

$$E=RT/V(Po/Pi)$$

Wherein R is the gas constant, T is the temperature in K, V is molar volume, Po is the saturated vapor pressure of arsine at temperature T, and Pi is the partial pressure.

Figure 4:
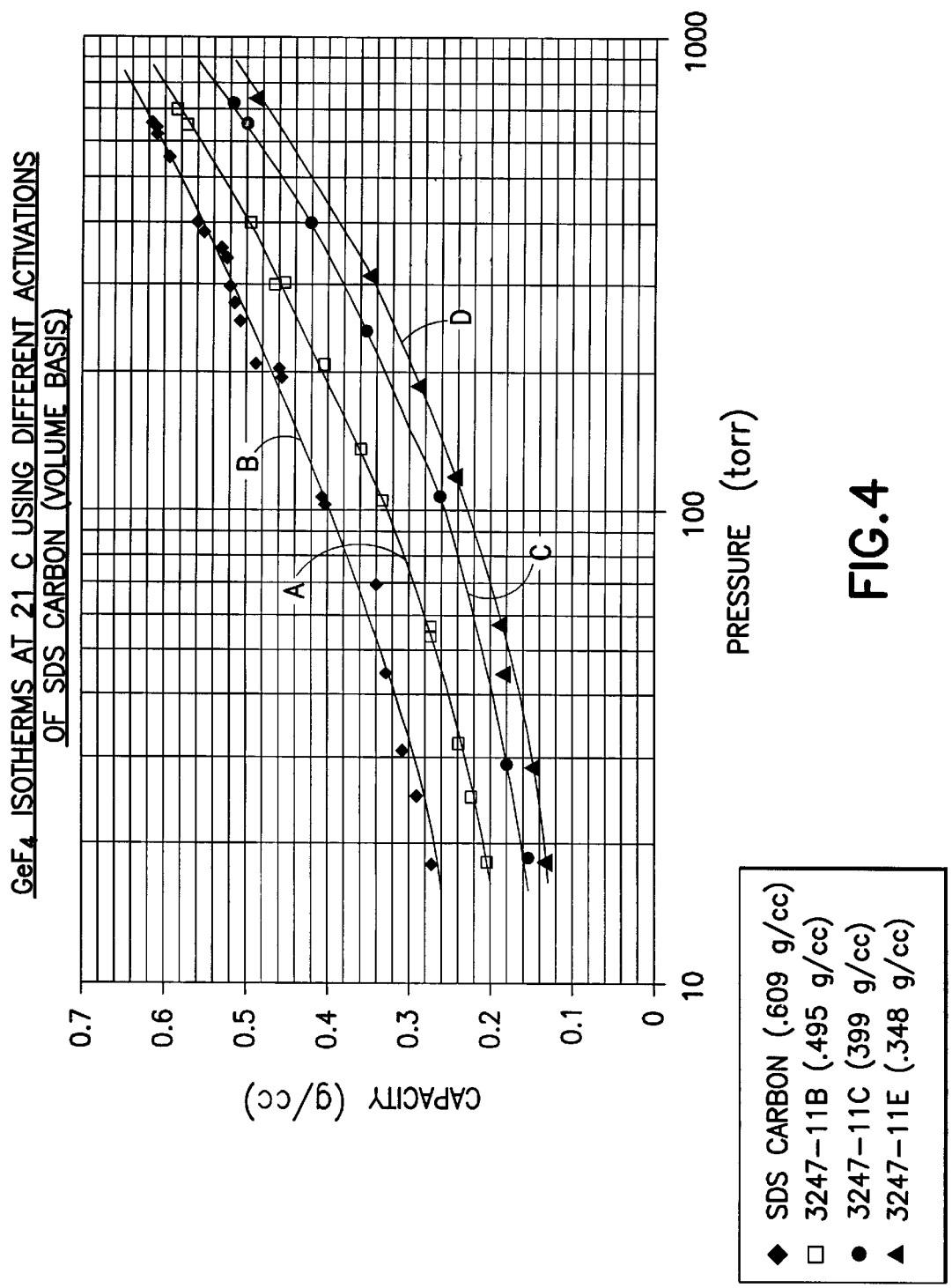
FIG. 4 is a graph of adsorption isotherms of various types of carbon sorbent materials for germanium tetrafluoride at 21° C., as a plot of the Sorbent Loading Capacity of GeF4, as a function of logarithm of the pressure in Torr. Curve A indicates Sorbent Loading Capacity response of the conventional carbon sorbent to pressure changes, and Curves B, C, and D comparatively represent Sorbent Loading Capacity responses of the three carbon sorbent materials of the present invention whose characteristic curves are correspondingly identified in FIG. 1.

FIG. 4 is a graph of $GeF_4$ adsorption isotherms of various carbon sorbent materials, including conventional SDS carbon material and the low Heel carbon materials 3247-11B, 11C, and 11E employed by the present invention. Such isotherms are measured for germanium tetrafluoride ($GeF_4$) at 21° C., according to the same procedure as described hereinabove. Curve A indicates the Loading Capacity response of the conventional carbon SDS to pressure changes, and curves B, C, and D represent the low Heel carbon sorbents 3247-11B, 11C, and 11E, as preferred by the practice of the present invention.

It is seen that for a pressure change from 650 Torr to 20 Torr at the same temperature, the Sorbent Working Capacities of all four curves for $GeF_4$ are substantially the same. However, the Heels indicated by curves A, B, C, D at 20 Torr are different. Heels of the three carbon sorbents represented by curves B, C, and D are significantly lower than Heel of the conventional carbon represented by curve A.

Thus, using $GeF_4$ as a measuring sorbate fluid, preferred low Heel carbon materials useful in the fluid and dispensing system of the present invention include those having an adsorption isotherm curve for $GeF_4$ at 21° C. resembling any of curves B, C, and D in FIG. 4.

Figure 5:
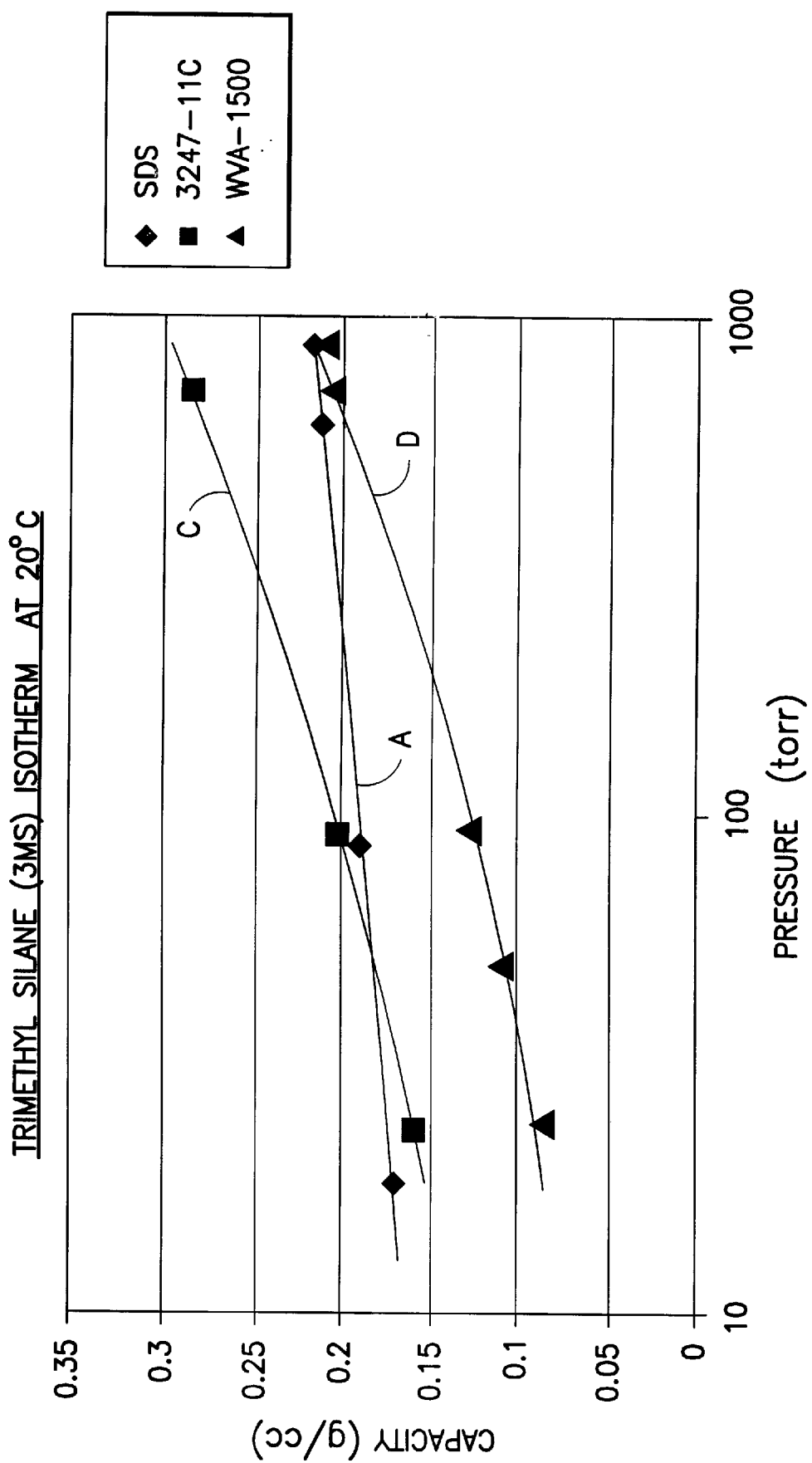
FIG. 5 is a graph of adsorption isotherms of various types of carbon sorbent materials for trimethyl silane at 20° C., as a plot of the Sorbent Loading Capacity of 3MS, as a function of logarithm of the pressure in Torr. Curve A indicates Sorbent Loading Capacity response of the conventional carbon sorbent to pressure changes, and Curves C and D comparatively represent Sorbent Loading Capacity responses of two carbon sorbent materials of the present invention whose characteristic curves are correspondingly identified in FIG. 1.

FIG. 5 is graph of 3MS adsorption isotherms of various carbon sorbent materials, including conventional SDS carbon material and the low Heel carbon materials 3247-11C and WVA-1500 employed by the present invention. Such isotherms are measured for trimethyl silane (3MS) at 20° C., according to the same procedure as described hereinabove. Curve A indicates the Loading Capacity response of the conventional carbon SDS to pressure changes, and curves C and D represent the low Heel carbon sorbents 3247-11C and WVA-1500 as preferred by the practice of the present invention.

For a pressure change from about 650 Torr to about 20 Torr at the same temperature, the elevation of Curves C and D for $GeF_4$ are substantially larger than that of Curve A, vehicle means that within the same pressure change range, the carbon sorbents 3247-11C and WVA-1500 have larger Sorbent Working Capacities than that of the conventional SDS sorbent material. Moreover, the Heels indicated by Curves C and D at 20 Torr are lower than that of Curve A.

Thus, using 3MS as a measuring sorbate fluid, preferred low Heel carbon materials useful in the fluid and dispensing system of the present invention include those having an adsorption isotherm curve for 3MS at 20° C. resembling any of Curves C and D as in FIG. 5.

The low Heel carbon materials used in the present invention thus demonstrate significantly improved adsorption characteristics for arsine ($AsH_3$), boron trifluoride ($BF_3$), germanium tetrafluoride ($GeF_4$), arsenic pentafluoride ($AsF_5$), and trimethyl silane (3MS), in relation to conventional carbon materials, as demonstrated by Tables 1–5.

Bead reactivated carbon materials, having a highly uniform spherical shape, are highly advantageous in the practice of the present invention. It will be appreciated, however, that the size, shape, porosity, and pore dimensional characteristics may all be widely and separately varied, as desirable in a given end use application.

Apparent density of preferred carbon materials in the practice of the present invention is less than 0.5 g/cc, and the ash content of such preferred carbon materials is less than about 6% by weight. Ash is an inorganic material, including constituents such as silica that can be detrimental in applications involving sorbable fluids such as hydrogen fluoride and boron trifluoride, which will irreversibly chemisorb to these types of compounds. Such chemisorption is highly disadvantageous, since it will result in the loss of the chemisorbed compound and consequent reduction in the amount of fluid that can be dispensed from the system. Accordingly, low ash content sorbents are particularly preferred in practice. Ash content of less than 1% by weight is therefore more highly preferred, and most preferred carbon sorbent materials have about 0% ash content, e.g., 0.01% by weight or less.

Moisture is another undesired impurity in the carbon sorbent material of the present invention, since it can cause decomposition of the sorbate fluid that is sorbed by the carbon sorbent medium. Accordingly, preferred carbons have moisture content $\leq 0.40\%$ by weight, more preferably $\leq 0.20\%$, and most preferably in the vicinity of about 0%, e.g., below 0.05%, based on the weight of the carbon sorbent material.

Figure 6:
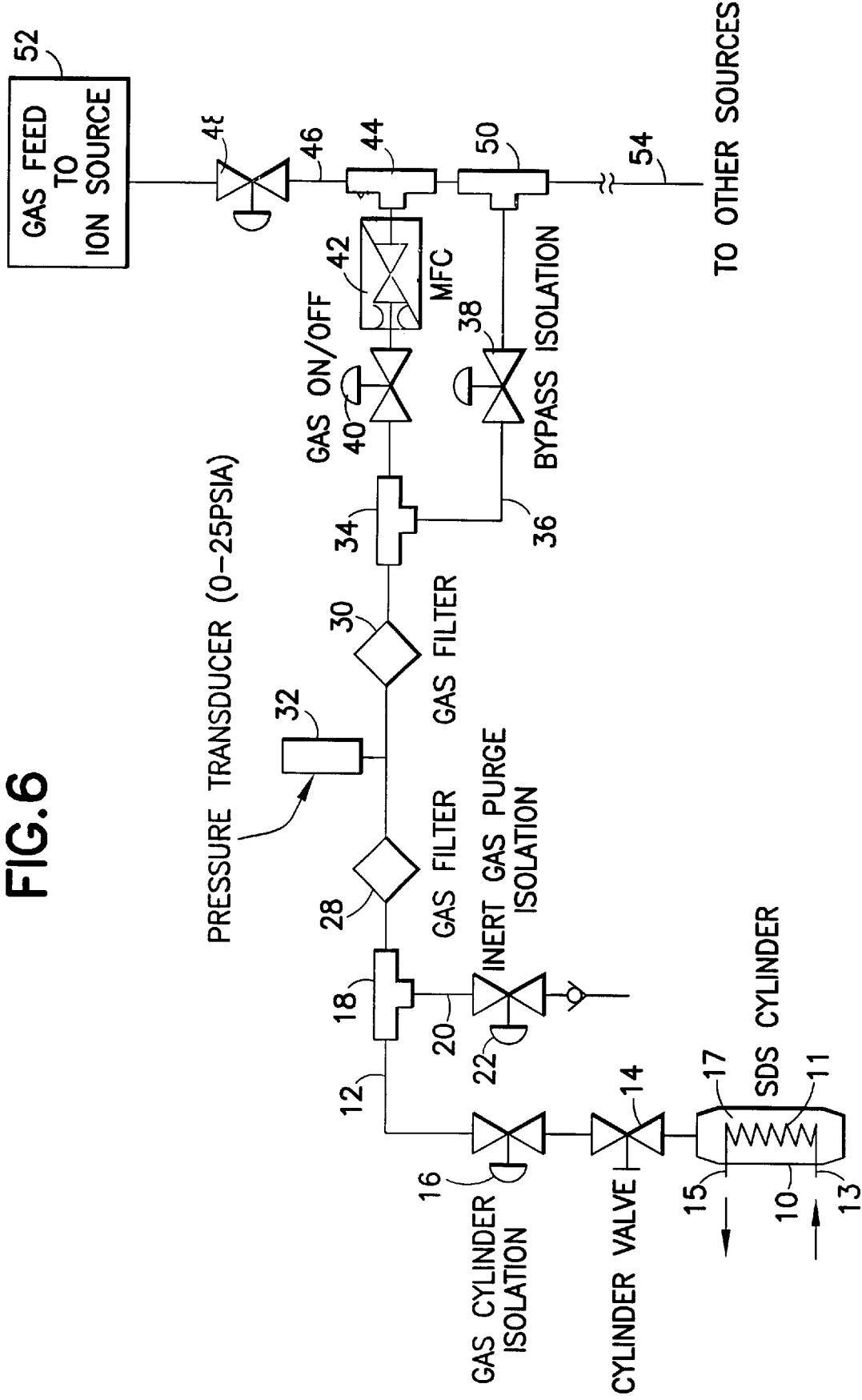
FIG. 6 is a schematic representation of a storage and delivery system according to one embodiment of the present invention.

FIG. 6 is a schematic representation of a storage and delivery system according to one embodiment of the invention.

In the schematic storage and delivery system shown in FIG. 6, a gas storage cylinder 10 is provided which may be filled with a bed 17 of suitable low Heel carbon sorbent material. e.g., a bead carbon sorbent medium of a type as more fully described hereinabove. The gas cylinder 10 contains a bed 17 of low Heel carbon sorbent material, with the sorbent material having physically adsorbed gas component(s) adsorbed on its surfaces (including surfaces within pores as well as on the exterior surface of the sorbent medium).

The cylinder 10 is connected to a manifold 12, having disposed therein a cylinder valve 14 for controllably releasing gas from cylinder 10, upstream of a gas cylinder isolation valve 16, which may be selectively actuated to close cylinder 10 to communication with the manifold 12.

The manifold has a branch fitting 18 therein, by means of which the manifold 12 is coupled in gas flow communication with a branch purge line 20 having inert gas purge isolation valve 22 therein, whereby the manifold may be purged with inert gas, prior to active operation delivery of gas from cylinder 10.

Downstream from the fitting 18, the manifold contains two successive gas filters 28 and 30, intermediate of which is disposed a pressure transducer 32 which may, for example, have a pressure operating range of from about 0 to about 25 psia.

The manifold 12 is connected downstream of gas filter 30 with a branch fitting 34 to which is coupled a bypass conduit 36 having bypass isolation valve 38 therein. The manifold 12 downstream of fitting 34 has a gas flow on-off valve 40 therein, downstream of which is disposed a mass flow controller 42 for controllably adjusting the flow rate of the hydride or halite gas dispensed through manifold 12.

At its terminus downstream of mass flow controller 42, the manifold 12 is connected by coupling fitting 44 to dispensing line 46 having flow control valve 48 therein, as well as being coupled in gas flow communication with bypass line 36 via coupling fitting 50. The discharge line 46 is shown as being joined to an ion source generating means, schematically shown as element 52. The other end 54 of discharge line 46 may be suitably coupled in gas flow communication with another gas dispensing means, as desirable in a given end use application of the FIG. 3 storage and delivery system apparatus.

Shown as an optional feature of the storage and dispensing vessel 10 in the FIG. 6 embodiment is a heat exchange passage 11 that extends vertically upwardly through the bed 17 of sorbent material. The heat exchange passage is joined at its respective lower and upper ends to heat exchange fluid feed inlet line 13 and heat exchange fluid effluent discharge line 15. The heat exchange fluid feed inlet line 13 may in turn be joined to a suitable source of heat exchange fluid (not shown) which may be operatively associated with a burner, resistance heater, or other.

Thermal desorption thus may be effected by passage of a suitable heat exchange fluid through the feed inlet line 13, the heat exchange passage 11, and the fluid effluent discharge line 15, for recirculation (e.g., by pump and reservoir means, not shown) through the heat exchange circuit. Such heating means thereby function to heat the sorbent medium in the bed 17 to sufficient elevated temperature for thermally-assisted desorption to take place.

By the arrangement schematically shown in FIG. 6, thermally-assisted desorption and dispensing of the sorbate fluid may be carried out alternatively to, or in combination with, pressure differential-mediated dispensing of the sorbate fluid, with the choice of the specific desorption modality being readily selected and/or determinable without undue experimentation by those skilled in the art.

In the manufacture of the storage and dispensing system of the invention, the storage and dispensing vessel is cleaned, if required, to ensure the absence of any contaminants or species therein, including out-gassable species in the walls of the vessel, which may adversely impact the storage and dispensing operation subsequently carried out with the vessel.

For this purpose, it may be desirable to bake out, solvent degrease, or otherwise subject the vessel and its interior surfaces to cleaning, removal or treatment steps, to provide an appropriately clean container for the subsequently installed sorbent material.

The low Heel carbon sorbent material then is loaded into the interior volume of the storage and dispensing vessel, and the vessel is final assembled and sealed. The sorbent material may be cleaned or processed prior to its introduction to the vessel, so that the sorptive capacity of the sorbent medium is maximized. Additionally, or alternatively, the sorbent medium may be cleaned or processed in situ, to ensure maximum sorptive capacity, e.g., by bake-out of the vessel containing the sorbent, at sufficient elevated temperature and for sufficient time to desorb and clean the sorbent material of extraneous sorbate species. For example, the vessel may be evacuated (degassed) for an extended period of time, e.g., 48 hours, at a suitable elevated temperature, e.g., 200–400° C., using an appropriate vacuum pump or other evacuation means. After evacuation, the vessel is allowed to cool to room temperature over a suitable period of time, e.g., ~6–12 hours.

After the evacuation/degas procedure, the evacuated sorbent container is connected to a sorbate fluid fill manifold. It will be recognized that the sorption of fluid species may involve significant exotherm due to heat of adsorption effects, and therefore it is desirable to maintain the vessel and the low Heel carbon sorbent material at suitable temperature so that the sorbate fluid is not desorbed by such heat effects after its initial take-up by the carbon sorbent material.

In order to maintain an approximate isothermal condition, the cylinder may for example be immersed in a thermal ballast liquid, such as for example an aqueous ethylene glycol mixture maintained at a constant temperature of 25° C.

The sorbate fluid fill manifold may be evacuated prior to sorbate fluid dispensing to appropriately low pressure, e.g., to less than $10^{-3}$ Torr, to remove non-condensable gases that may be present in the flow passages of the fill manifold. After such evacuation, the carbon sorbent-containing vessel may be filled with the sorbate fluid at a suitable rate until the desired pressure level is reached. For purposes of efficiency, it may be desirable to monitor the pressure of the vessel during the fill operation with a suitable pressure monitor or other (e.g., transducer-based) sensing means.

During the filling process, the temperature of the vessel and the thermal ballast tank may be independently monitored, along with the sorbate fluid temperature, for process control puposes. Pressure is monitored to determine the endpoint of the fill process.

It may be desirable to fill the vessel with the sorbate fluid in stages, and to allow equilibration of the system so that the temperature effects are at least partially dissipated to the ambient environment or to a heat transfer medium such as the thermal ballast liquid described hereinabove.

Alternatively, it may be suitable to fill the vessel to a specified pressure, and then allow the vessel to cool to a final temperature and pressure condition of the low Heel carbon sorbent bed and associated vessel.

Thus, dose filling or continuous filling of the sorbate fluid may be carried out, to introduce the sorbate fluid into the vessel for sorptive take-up by the carbon sorbent material therein. Following the fill sequence, the vessel, after its disengagement from the fill manifold, may be shipped, stored, or arranged for subsequent dispensing use by attachment to piping, coupling, and dispensing circuitry at the dispensing site.

Figure 7:
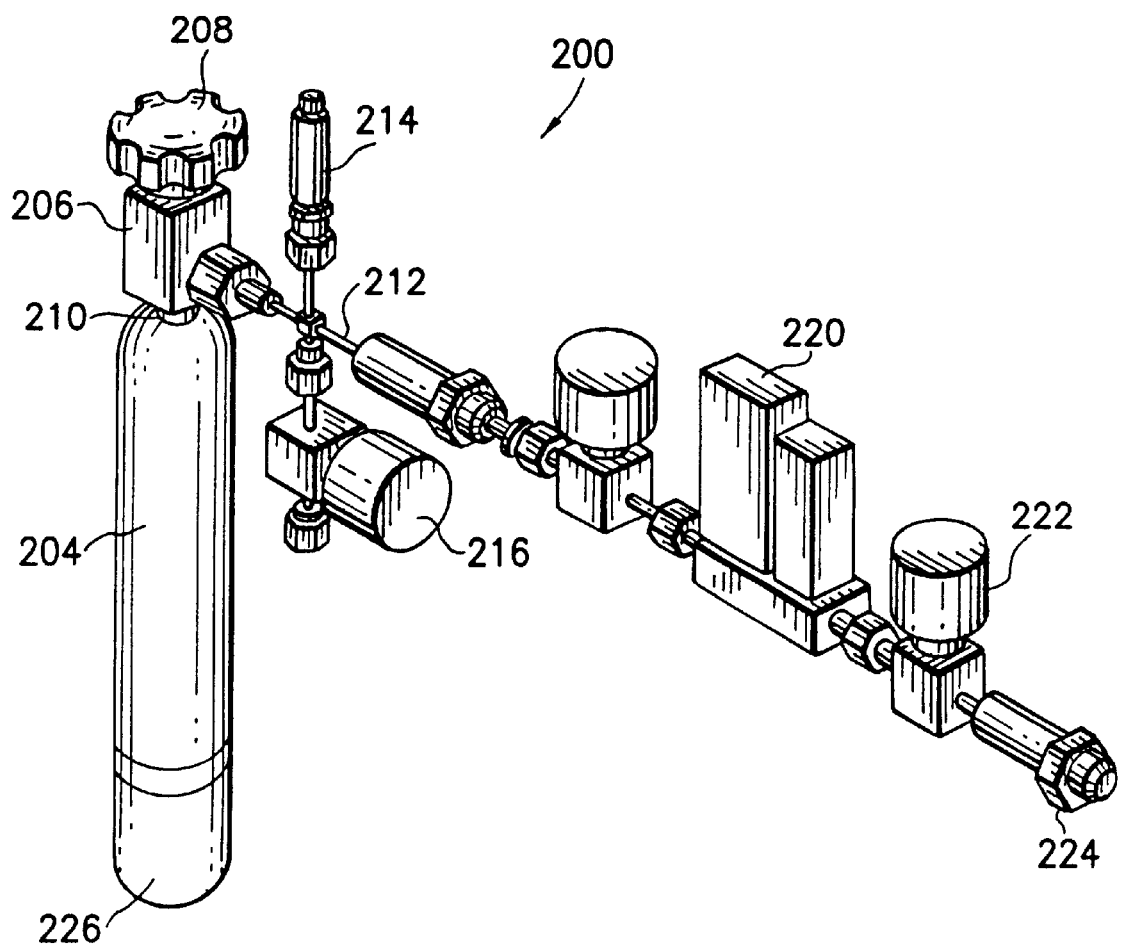
FIG. 7 is a perspective schematic representation of a storage and dispensing system according to another embodiment of the present invention.

FIG. 7 is a perspective schematic view of a storage and dispensing system 200 according to another embodiment of the invention.

As shown, the storage and dispensing system 200 comprises a storage and dispensing vessel 204 having a base portion 226 and which is joined at its upper portion to valve head 206 comprising part of a dispensing assembly including manual actuator 208 for the valve head on the cylinder. The valve head is joined by means of coupling 210 to a dispensing conduit 212 having disposed therein a pressure transducer 214, all inert purge unit 216 for purging the dispensing assembly with inert gas, a mass flow controller 220 for maintaining constant flow rate through the dispensing conduit 212 during the dispensing operation, and a filter 222 for removing particulates from the dispensed gas prior to its discharge from the dispensing assembly.

The dispensing assembly further comprises a coupling 224, for engaging the dispensing assembly with downstream piping, valving, or other structure associated with the locus of use of the desorbed fluid.

Figure 8:
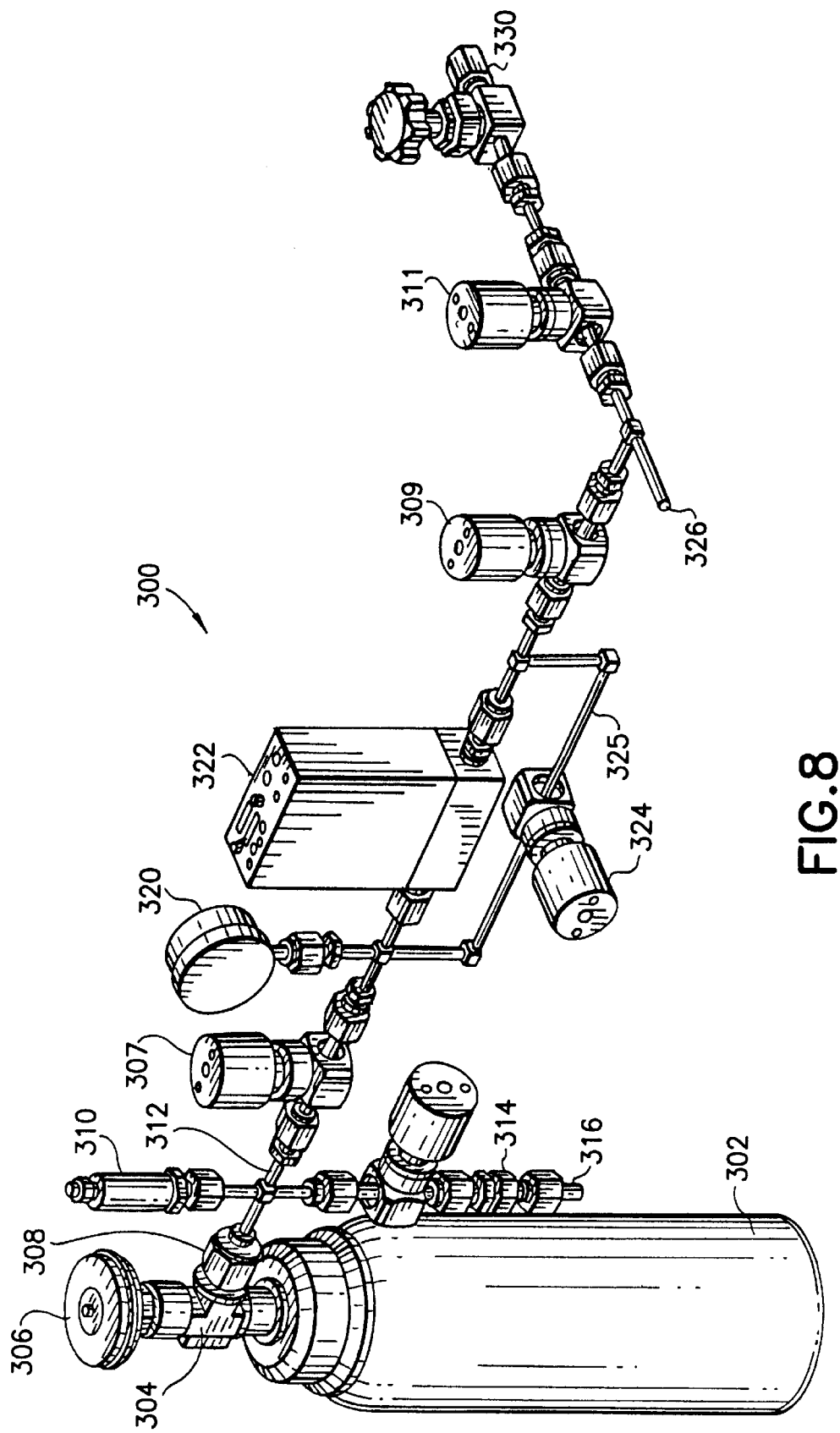
FIG. 8 is a perspective schematic representation of an apparatus including a gas storage and dispensing system according to another embodiment of the present invention, specifically adapted for ion implantation process applications.

FIG. 8 is a process system 300 including a storage and dispensing arrangement for delivery of gas, in accordance with one embodiment of the invention, for ion implantation use of the dispensed gas.

As shown, the apparatus includes a storage and dispensing vessel 302 having joined to its upper end a valve head 304 coupled with a manual valve actuator wheel 306. The valve head is coupled to a VCR filter gasket 308, which in turn is coupled with flow conduit 312. Flow conduit 312 communicates with the pressure transducer 310, as well as the check valve 314 and nitrogen purge inlet 316. The nitrogen purge inlet 316 is employed for introduction of nitrogen or other purge gas for clearance of the dispensing assembly flow passages, for subsequent dispensing of gas from vessel 302.

Flow conduit 312 has further disposed therein a flow control valve 307, a span gauge 320, a flow controller 322 and flow control valve 309. The flow conduit 312 also is coupled in flow circuit-forming relationship to the bypass conduit 325 having by-pass valve 324 therein. The flow conduit 312 is joined at its right hand end as shown, to gas box manifold conduit 326. Conduit 326 has valve 311 positioned therein, and has a coupling 330 opposite the end communicating with the gas box manifold, for coupling of the storage and dispensing system with the ion implantation chamber.

In operation, gas from the sorbent bed (not shown) in storage and dispensing vessel 302 is flowed in flow conduit 312 and gas box manifold conduit 326 to the ion implantation chamber, at a controllable rate, as controlled by flow controller 322. The pressure transducer 310 may be operatively coupled in relationship to flow controller 322, as well as other elements, e.g., valves, in the flow circuit, to carry out the dispensing of the gas for ion implantation, in a suitable manner.

Figure 9:
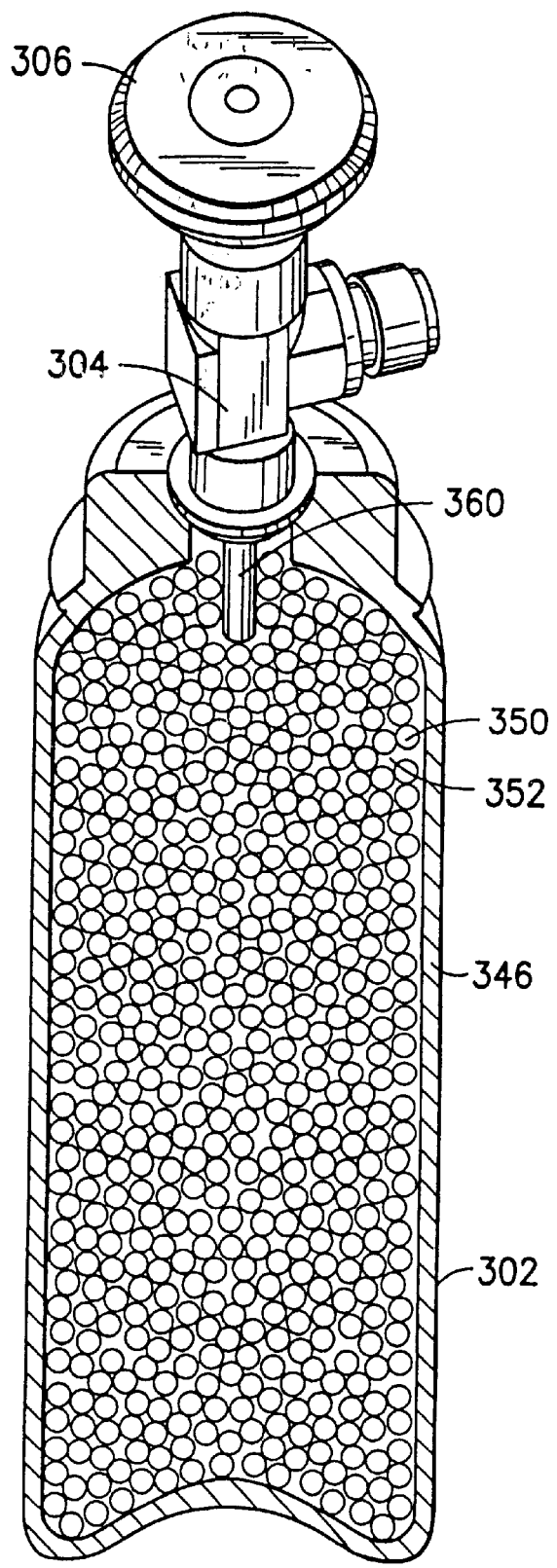
FIG. 9 is a perspective sectional view of the gas storage and dispensing vessel of the FIG. 8 system, showing the interior structure thereof.

FIG. 9 is a perspective cross-sectional view of the storage and dispensing vessel 302 of FIG. 5, showing the interior structure of such vessel.

As shown, the vessel 302 comprises a wall 346 enclosing an interior volume 352 of the vessel, and containing a particulate sorbent material 350 therein. At the upper end of the vessel, at the port to which the valve head 304 is joined, a porous sintered tube 360, or other foraminous or otherwise gas-permeable structure serving to prevent entrainment in the dispensed gas of particulate solids from the bed of the sorbent material, may be advantageously provided.

The fluid storage and delivery apparatus and method of the invention provide a significantly safer alternative to current use of high-pressure gas cylinders for storage and dispensing of sorbable gases. Such apparatus and method enable transport, storage and delivery of sorbable fluids from a cylinder or other vessel at low pressure, e.g., zero psig. In such apparatus and method, sorbable gases are physically adsorbed by the pores, surfaces and microcavities of the carbon sorbent of low Heels, thereby significantly reducing the pressure of gas for storage and dispensing purposes.

With only low level heating of the sorbent material in the practice of the present invention, by so-called thermally assisted delivery, it is possible to augment the delivery rate of the desorbing gas, so that flow rates of up to 500 standard cubic centimeters per minute (sccm) and higher are readily achievable. Nonetheless, high rates of gas delivery are achieved in the broad practice of the present invention with adiabatic operation (no supplemental input of heat or thermal energy to the sorbate-laden sorbent medium), solely by the pressure differential existing between the sorbent vessel and the reduced pressure of the external dispensing locus, e.g., in a semiconductor or other industrial or manufacturing process facility, such as an ion implantation chamber, molecular beam epitaxy unit, or chemical vapor deposition reactor.

The apparatus of the present invention may be readily provided in a unitary apparatus form, as for example by disposing one or more storage and dispensing systems of the invention in a gas cabinet. In such gas cabinet arrangement involving a multiplicity of sorbent vessels, each of the vessels may be manifolded together for selective delivery of sorbate gas from one or more of such vessels. The cabinet may further include therein independent thermocouples, or other temperature sensing/monitoring equipment and components, for preventing overheating of the vessels and/or other internal components of the gas cabinet, in use thereof.

Such gas source cabinet may additionally include: a fusible link heater element for selective augmentation heating of the vessels and sorbent therein; a sprinkler system; an exhaust heat sensor; a toxic gas monitor which functions to shut down the apparatus when toxic gas is sensed; a scrubber or bulk sorption device; and redundant pressure and temperature control means. With such a storage and delivery system apparatus, delivery rates of gas of 500 sccm at 15 psig are readily attainable.

The storage and dispensing system of the present invention may be operatively connected with any suitable downstream process, for utilization of the dispensed gas. For example, the storage and dispensing system may be joined in flow supply relationship to a downstream fluid-consuming facility of suitable type, e.g., to an ion implantation chamber, a silicon semiconductor processing plant, a compound semiconductor processing plant, a flat panel display manufacturing facility, organic synthesis equipment, a pharmaceutical manufacturing facility, an anesthesia gas dispensing mask, an air treatment or water pollution abatement facility, a stove or burner in the case of combustible gases, or any other suitable downstream means or process facility, for end use of the gas dispensed from the storage and dispensing system of the invention.

The storage and dispensing system of the invention may be practiced with a wide variety of low Heel carbon sorbent materials, of widely varying pore size, porosity, morphology, and chemical modification.

The storage and dispensing system of the invention may be utilized for delivery of liquids as well as gases, vapors, multicomponent and multiphase fluid streams, etc. The storage and dispensing system may also be employed for dispensing of sublimatable solids, and the storage and dispensing system may be coupled with reaction vessels serving to react the dispensed fluid to an intermediate or final product for ultimate usage. For example, the storage and dispensing system may dispense boron triflllloride gas to a downstream hydrogenation chamber, in which the boron trifluoride is contacted under appropriate reaction conditions with a hydrogenating agent such as magnesium hydride, to yield diborane, for subsequent use, e.g., ion implantation, doping, or other usage.

Ion implantation is a particularly preferred application for the storage and dispensing system of the invention, and in the dispensing of diborane, germane, silicon tetrafluoride, and antimony-containing gases.

For thermally-assisted desorption of the sorbable fluid from the sorbent bed in the storage and dispensing vessel, any suitable energy source may be employed to effect such heating, including RF, IR, and UV radiation, ultrasonic and microwave radiation, as well as heating by other direct and indirect means and methods, such as electrical resistance heating, deployment of extended heat transfer surface or heat exchange passages in the sorbent bed, etc.

While the invention has been illustratively described herein with reference to various exemplary embodiments and aspects, it will be appreciated that the invention is not thus limited, but rather extends to and is inclusive of other variations, modifications and additional embodiments. The invention therefore is intended to be broadly construed and interpreted, as including all such variations, modifications and additional embodiments, within the spirit and scope of the ensuing claims.

What is claimed is:

1. An apparatus comprising:
    a vessel;
    a solid-phase carbon sorbent medium disposed in said vessel;
    a sorbable fluid reagent physically adsorbed on said solid-phase carbon sorbent medium; and
    a dispensing assembly coupled in gas flow communication with said vessel for dispensing said sorbable fluid reagent from said solid-phase carbon sorbent medium, said solid-phase carbon sorbent medium having a Heel, measured at between about 20° C. and about 21° C. at between about 20 Torr and about 25 Torr, of not more than about 700 grams of a gaseous form of said sorbable fluid reagent per liter of a bed of said solid-phase carbon sorbent medium.

2. The apparatus of claim 1, wherein said carbon sorbent medium has a Heel, measured for gaseous arsine ($AsH_3$) at about 20° C. at about 20 Torr, of not more than about 50 grams $AsH_3$ per liter of the bed of said sorbent medium.

3. The apparatus of claim 2, wherein said carbon sorbent medium has a Sorbent Working Capacity, measured for gaseous $AsH_3$ at about 20° C. from about 650 Torr to about 20 Torr, of at least about 260 grams $AsH_3$ per liter of the bed of said sorbent medium.

4. The apparatus of claim 1, wherein said carbon sorbent medium has a Heel, measured for gaseous boron trifluoride ($BF_3$) at about 20° C. at 20 Torr, of not more than about 20 grams boron trifluoride per liter of the bed of said sorbent medium.

5. The apparatus of claim 4, wherein said carbon sorbent medium has a Sorbent Working Capacity, measured for gaseous $BF_3$ at about 20° C. from about 650 Torr to about 20 Torr, of at least about 50 grams $BF_3$ per liter of the bed of said sorbent material.

6. The apparatus of claim 1, wherein said carbon sorbent medium has a Heel, measured for gaseous germanium tetrafluoride (GeF$_4$) at about 20° C. at about 20 Torr, of not more than about 250 grams GeF$_4$ per liter of the bed of said sorbent medium.

7. The apparatus of claim 6, wherein said carbon sorbent medium has a Sorbent Working Capacity, measured for gaseous GeF$_4$ at about 20° C. from about 650 Torr to about 20 Torr, of at least about 350 grams GeF4 per liter of the bed of said sorbent medium.

8. The apparatus of claim 1, wherein said carbon sorbent medium has a Heel, measured for gaseous arsenic pentafluoride (AsF$_5$) at about 20° C. at about 20 Torr, of not more than about 700 grams AsF$_5$ per liter of the bed of the sorbent material.

9. The apparatus of claim 8, wherein said carbon sorbent medium has a Sorbent Working Capacity, measured for gaseous AsF$_5$ at about 20° C. from about 650 Torr to about 20 Torr, of at least about 150 grams AsF$_5$ per liter of the bed of said sorbent medium.

10. The apparatus of claim 1, wherein said carbon sorbent medium has a Heel, measured for gaseous trimethyl silane (3MS) at about 20° C. at about 20 Torr, of not more than about 160 grams 3MS per liter of the bed of said sorbent medium.

11. The apparatus of claim 10, wherein said carbon sorbent medium has a Sorbent Working Capacity, measured for 3MS at about 20° C. from about 650 Torr to about 20 Torr, of at least about 70 grams 3MS per liter of the bed of said sorbent medium.

12. The apparatus of claim 1, wherein said carbon sorbent medium has a Heel, measured for gaseous ethane (C$_2$H$_6$) at about 21° C. at about 25 Torr, of not more than about 10 grams ethane per liter of the bed of said sorbent medium.

13. The apparatus of claim 1, wherein said carbon sorbent medium has a characteristic curve substantially represented by one of curves B, C, and D in FIG. 1.

14. The apparatus of claim 1, wherein said carbon sorbent medium characterized by an isotherm curve, measured for germanium tetrafluoride (GeF$_4$) at about 21° C. and substantially represented by one of curves B, C, and D in FIG. 4.

15. The apparatus of claim 1, wherein said carbon sorbent medium is characterized by an isotherm curve, measured for trimethyl silane at about 20° C. and substantially represented by one of curves C and D in FIG. 5.

16. The apparatus of claim 1, wherein said carbon sorbent medium has a sorption waste rate, measured for arsine (AsH$_3$) at about 20° C. from about 650 Torr to about 20 Torr, of not more than about 20%.

17. The apparatus of claim 1, wherein said carbon sorbent medium has a sorption waste rate, measured for arsine (AsH$_3$) at about 20° C. from about 650 Torr to about 20 Torr, of not more than about 15%.

18. The apparatus of claim 1, wherein said carbon sorbent medium has a sorption waste rate, measured for arsine (AsH$_3$) at about 20° C. from about 650 Torr to about 20 Torr, of not more than about 12%.

19. The apparatus of claim 1, wherein said carbon sorbent medium has a sorption waste rate, measured for boron trifluoride (BF$_3$) at about 20° C. from about 650 Torr to about 20 Torr, of not more than about 38%.

20. The apparatus of claim 1, wherein said carbon sorbent medium has a sorption waste rate, measured for germanium tetrafluoride (GeF$_4$) at about 20° C. from about 650 Torr to about 20 Torr, of not more than about 40%.

21. The apparatus of claim 1, wherein said carbon sorbent medium has a sorption waste rate, measured for germanium tetrafluoride (GeF$_4$) at about 20° C. from about 650 Torr to about 20 Torr, of not more than about 35%.

22. The apparatus of claim 1, wherein said carbon sorbent medium has a sorption waste rate, measured for germanium tetrafluoride (GeF$_4$) at about 20° C. from about 650 Torr to about 20 Torr, of not more than about 30%.

23. The apparatus of claim 1, wherein said carbon sorbent medium has a sorption waste rate, measured for arsenic pentafluoride (AsF$_5$) at about 20° C. from about 650 Torr to about 20 Torr, of not more than about 75%.

24. The apparatus of claim 1, wherein said carbon sorbent medium has a sorption waste rate, measured for arsenic pentafluoride (AsF$_5$) at about 20° C. from about 650 Torr to about 20 Torr, of not more than about 70%.

25. The apparatus of claim 1, wherein said carbon sorbent medium has a sorption waste rate, measured for trimethyl silane (3MS) at about 11° C. from about 650 Torr to about 20 Torr, of not more than about 60%.

26. The apparatus of claim 1, wherein said carbon sorbent medium has a sorption waste rate, measured for trimethyl silane (3MS) at about 11° C. from about 650 Torr to about 20 Torr, of not more than about 55%.

27. The apparatus of claim 1, wherein said carbon sorbent medium has a sorption waste rate, measured for trimethyl silane (3MS) at about 11° C. from about 650 Torr to about 20 Torr, of not more than about 45%.

28. The apparatus of claim 1, wherein said carbon sorbent medium is in a form selected from a group consisting of beads, granules, pellets, tablets, powders, particulates, extrudates, cloth, a web form material, a honeycomb matrix monolith, a comminuted form, and a crushed form.

29. The apparatus of claim 1, wherein said carbon sorbent medium is in the form of beads, having a substantially uniform and substantially spherical shape.

30. The apparatus of claim 1, wherein said carbon sorbent medium has an apparent density of less than about 0.5 g/cc.

31. The apparatus of claim 1, wherein said carbon sorbent medium has an ash content of about 0%.

32. The apparatus of claim 1, wherein said carbon sorbent medium has a moisture content of not more than about 0.04%.

33. The apparatus of claim 1, wherein said carbon sorbent medium has a moisture content of about 0%.

34. The apparatus of claim 1, wherein said carbon sorbent medium has been treated by application of a sorption-enhancing material to lower the Heel and to increase the Sorbent Working Capacity.

35. The apparatus of claim 34, wherein said carbon sorbent medium is fluorinated.

36. A method comprising:
providing a vessel containing a solid-phase carbon sorbent medium;
adsorbing a fluid reagent on the solid-phase carbon sorbent medium, the solid-phase carbon sorbent medium having a Heel, measured at between about 20° C. and about 21° C. at between about 20 Torr, and about 25 Torr, of not more than about 700 grams of a gaseous form of the fluid reagent per liter of a bed of the solid-phase carbon sorbent medium;
desorbing the fluid reagent from the solid-phase carbon sorbent medium; and dispensing the desorbed fluid reagent from the vessel.

37. The method of claim 36, wherein the fluid reagent includes an arsenic-containing compound and the Heel is measured at about 20° C. at about 20 Torr.

* * * * *